US012335905B2

(12) United States Patent
Shuai et al.

(10) Patent No.: US 12,335,905 B2
(45) Date of Patent: Jun. 17, 2025

(54) TERMINAL POSITIONING METHOD, SERVER, AND STORAGE MEDIUM

(71) Applicant: ZTE CORPORATION, Shenzhen (CN)

(72) Inventors: Zhe Shuai, Shenzhen (CN); Jie Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 566 days.

(21) Appl. No.: 17/760,201

(22) PCT Filed: Dec. 4, 2020

(86) PCT No.: PCT/CN2020/133918
§ 371 (c)(1),
(2) Date: Jan. 23, 2023

(87) PCT Pub. No.: WO2021/164375
PCT Pub. Date: Aug. 26, 2021

(65) Prior Publication Data
US 2023/0199703 A1 Jun. 22, 2023

(30) Foreign Application Priority Data
Feb. 19, 2020 (CN) .......................... 202010101268.X

(51) Int. Cl.
*H04W 64/00* (2009.01)
(52) U.S. Cl.
CPC ................................. *H04W 64/003* (2013.01)
(58) Field of Classification Search
CPC ............. H04W 64/003; H04W 84/045; H04W 88/085; H04W 64/00; H04W 4/33;
(Continued)

(56) References Cited

U.S. PATENT DOCUMENTS

2013/0017852 A1* 1/2013 Liu ...................... H04W 88/085
455/507
2013/0322235 A1* 12/2013 Khoryaev ............. H04L 5/0073
370/229
(Continued)

FOREIGN PATENT DOCUMENTS

CN 101389118 A 3/2009
CN 101399588 A 4/2009
(Continued)

OTHER PUBLICATIONS

International Searching Authority. International Search Report and Written Opinion for PCT Application No. PCT/CN2020/133918 and English translation, mailed Feb. 26, 2021, pp. 1-10.

*Primary Examiner* — Nimesh Patel
(74) *Attorney, Agent, or Firm* — Vivacqua Crane, PLLC

(57) ABSTRACT

A method for positioning a terminal device, a server, and a non-transitory storage medium are provided. The method may include, identifying several Pico RRUs corresponding to a logical cell where a target terminal device is located, in response to a request for positioning the target terminal device being received, and the number of Pico RRUs is ≥3; acquiring several converged signals corresponding to Pico RRUs, each by converging of, a processed radio frequency signal received by the current Pico RRU, and radio frequency signals received by other Pico RRUs than the current Pico RRU; calculating geographic location information of the target terminal device according to converged signals corresponding to Pico RRUs and geographic location information of at least three Pico RRUs; and sending positioning information of the target terminal device including at least the geographic location information to a sender of the request for positioning.

19 Claims, 7 Drawing Sheets

(58) Field of Classification Search
CPC . H04W 24/10; H04W 72/0446; H04W 76/27; H04W 48/18; H04W 56/001; H04W 76/11; H04W 84/042; H04W 72/20; H04W 24/02; H04W 76/10; H04W 88/08; H04W 12/08; H04W 92/02; H04W 76/15; H04W 36/0033; H04W 72/542; H04W 72/56; H04W 48/20; H04W 8/08; H04W 8/24; H04W 36/302; H04W 48/10; H04W 52/245; H04W 28/0268; H04W 88/06; H04W 56/0015; H04W 8/205; H04W 92/12; H04W 76/16; H04W 88/12; H04W 92/20; H04W 28/02; H04W 36/08; H04W 4/029; H04W 52/242; H04W 72/541; H04W 74/002; H04W 72/27; H04W 72/51; H04W 92/04; H04W 76/14; H04W 8/005; H04W 16/18; H04W 52/0216; H04W 72/21; H04W 24/04; H04W 16/28; H04W 28/0865; H04W 4/70; H04W 52/0229; H04W 52/0235; H04W 72/04; H04W 76/28; H04W 84/12; H04W 28/0236; H04W 28/0247; H04W 28/065; H04W 28/12; H04W 4/02; H04W 4/023; H04W 40/246; H04W 40/20; H04W 52/0209; H04W 52/0212; H04W 52/0258; H04W 52/0274; H04W 16/14; H04W 16/10; H04W 16/20; H04W 28/0215; H04W 72/0453; H04W 72/046; H04W 72/0473; H04W 72/30; H04W 72/54; H04W 8/26; H04W 88/02; H04W 92/10; H04W 12/63; H04W 12/64; H04W 28/06; H04W 28/16; H04W 36/30; H04W 40/12; H04W 52/0245; H04W 52/028; H04W 52/24; H04W 52/243; H04W 4/021; H04W 4/025; H04W 4/80; H04W 64/006; G01S 5/02213; G01S 5/0205; G01S 5/14; G01S 5/0236; G01S 3/02; G01S 5/0009; G01S 11/14; G01S 5/02; G01S 3/808; G01S 5/0063; G01S 17/42; G01S 7/4817; G01S 17/34; G01S 7/4802; G01S 7/4861; G01S 7/4863; G01S 7/487; G01S 7/4876; G01S 7/497; G01S 7/52026; G01S 15/8979; G01S 15/899; G01S 17/02; G01S 17/32; G01S 5/0252; G01S 7/003; G01S 7/52063; G01S 7/5208; H04B 7/0695; H04B 7/0626; H04B 7/0617; H04B 17/336; H04B 17/309; H04B 17/345; H04B 17/318; H04B 7/0632; H04B 7/0452; H04B 7/0628; H04B 7/0413; H04B 17/328; H04B 7/15542; H04B 17/252; H04B 17/27; H04B 7/2612; H04B 1/0475; H04B 7/0408; H04B 17/373; H04B 17/382; H04B 17/20; H04B 1/715; H04B 17/10; H04B 17/12; H04B 17/26; H04B 17/327; H04B 2001/71566; Y02D 30/70; B64U 2201/20; B64U 2201/00; G06N 3/045; G06N 3/08; G06N 3/084; G06N 3/0495; G06N 3/0464; G06N 3/0475; G06N 3/082; G06N 20/00; G06N 3/047; G06N 3/088; G06N 3/044; H04L 1/0026; H04L 5/0035; H04L 5/0057; H04L 5/0053; H04L 1/0031; H04L 1/1671; H04L 41/08; H04L 41/082; H04L 41/0836; H04L 43/0811; H04L 65/80; H04L 67/303; H04L 67/52; H04L 2025/03426; H04L 2025/03802; H04L 25/0204; H04L 25/0212; H04L 25/0224; H04L 25/03019; H04L 25/03343; H04L 5/14; H04L 1/20; H04L 1/201; G06T 2207/10028; G06T 7/33; G06T 7/248

See application file for complete search history.

(56) References Cited

U.S. PATENT DOCUMENTS

| 2015/0245332 | A1* | 8/2015 | Chakrabarti | H04L 69/08 370/329 |
| 2021/0410142 | A1* | 12/2021 | Peng | H04L 5/0037 |
| 2022/0029892 | A1* | 1/2022 | Hooli | H04L 41/16 |

FOREIGN PATENT DOCUMENTS

| CN | 104010362 A | 8/2014 |
| CN | 106714100 A | 5/2017 |
| CN | 110118953 A | 8/2019 |
| EP | 3337195 A1 | 6/2018 |

* cited by examiner

TERMINAL POSITIONING METHOD, SERVER, AND STORAGE MEDIUM

CROSS-REFERENCE TO RELATED APPLICATION

This application is a national stage filing under 35 U.S.C. § 371 of international application number PCT/CN2020/133918, filed Dec. 4, 2020, which claims priority to Chinese patent application No. 202010101268.X, filed Feb. 19, 2020. The contents of these applications are incorporated herein by reference in their entirety.

TECHNICAL FIELD

The embodiment of present disclosure relates to the field of communication, in particular to a method for positioning a terminal device, a server and a non-transitory computer-readable storage medium.

BACKGROUND

Indoor distributed systems are successful schemes for improving the indoor mobile communication coverage in buildings for users therein. The indoor distributed systems evenly distribute the signals of mobile base stations in every corner indoor with distributed antennas, so as to ensure desired signal coverage indoor. The indoor distributed systems include active indoor distributed systems and passive indoor distributed systems, in which the active indoor distributed systems are distributed systems including baseband processing unit(s) and remote radio frequency unit(s) directly connected with the baseband processing unit(s).

As for the GPS positioning, the accuracy for indoor positioning is relatively low due to the signal is significantly attenuated by the buildings, such that GPS positioning is not appropriate for indoor positioning such as positioning at various floors within buildings. In the environment of active indoor distributed system, for the active indoor distributed systems are distributed systems including baseband processing unit(s) and remote radio frequency unit(s) directly connected with the baseband processing unit(s), positioning of a terminal device is usually done by means of a base station on the basis that, three or more logical cells present.

SUMMARY

A method for positioning a terminal device, a server and a non-transitory computer-readable storage medium are provided in various embodiments of the present disclosure.

In order to at least alleviate the above mentioned technical problems, an embodiment of the present disclosure provides a method for positioning a terminal device, performed by a baseband processing unit (BBU), the method may include, identifying a plurality of Pico Radio Remote Units (Pico RRUs) corresponding to a logical cell where a target terminal device is located, in response to a request for positioning the target terminal device being received, where the target terminal device is connected to network through the BBU, and the number of the plurality of Pico RRUs is greater than or equal to three; acquiring a plurality of converged signals each corresponding to a respective one of the plurality of Pico RRUs, where the converged signal corresponding to each current Pico RRU is acquired by converging of, a processed radio frequency signal received by the current Pico RRU, and radio frequency signals each received by a respective one of other Pico RRUs than the current Pico RRU in the plurality of Pico RRUs; calculating geographic location information of the target terminal device according to the converged signals each corresponding to a respective one of the plurality of Pico RRUs and geographic location information of at least three of the plurality of Pico RRUs; and sending positioning information of the target terminal device to a sender of the request for positioning, where the positioning information may include at least the geographic location information of the target terminal device.

An embodiment of present disclosure further provides a method for positioning a terminal device, performed by a Remote Radio Unit-Hub (RHUB), the method may include, receiving a request for acquiring converged signals of a plurality of Pico RRUs, where the number of Pico RRUs is greater than or equal to three; for each request for acquiring a converged signal of a current Pico RRU, processing a radio frequency signal received by the current Pico RRU to generate a processed radio frequency signal received by the current Pico RRU, and converging the processed radio frequency signal received by the current Pico RRU with the radio frequency signals received by other Pico RRUs in the plurality of Pico RRUs than the current Pico RRU, to generate the converged signal corresponding to the current Pico RRU; and sending a plurality of converged signals each corresponding to a respective one of the Pico RRUs to a BBU, such that the BBU can calculate the geographic location information of the target terminal device according to the plurality of converged signals each corresponding to a respective one of the Pico RRUs and the geographic location information of at least three Pico RRUs in the Pico RRUs.

An embodiment of present disclosure further provides a server, which may include, at least one processor; and a memory in communication with the at least one processor; where the memory stores at least one instruction executable by the at least one processor, which when executed by the at least one processor, causes the processor to carry out any method as described above.

An embodiment of the present disclosure further provides a non-transitory computer-readable storage medium storing at least one computer program, which when executed by a processor, causes the processor to carry out any one of the methods as described above.

BRIEF DESCRIPTION OF DRAWINGS

One or more embodiments are illustrated in conjunction with the corresponding figure in the drawings, which do not constitute the limitation of the embodiments. Same reference numerals in the drawings are assigned to the same elements, and unless otherwise stated, the figures in the drawings do not imply the scale.

DETAILED DESCRIPTION

Various embodiments of the present disclosure will be described in detail below in conjunction with the drawings to illustrate the purpose, technical scheme and advantages of the present disclosure. However, it shall be appreciated by those having ordinary skill in the art that many technical details are put forward in order to clarify the present disclosure. However, the technical solutions claimed in present disclosure can be practiced even without these technical details and various alternations and modifications based on the following embodiments. The following embodiments are divided for the convenience of description, and should not constitute any limitation on the implementation of present disclosure. The embodiments can be combined with and based on each other without conflict.

The inventor found that at least the following problems are present in the existing technology. Most of the remote radio frequency units in the active indoor distributed system are Pico Radio Remote Units (Pico RRUs) which have low power consumption, are small in size and are ceiling-mounted, and those units are connected with a Baseband Processing Unit (BBU) through Remote Radio Unit-Hub(s). In this distributed system, a plurality of Pico RRUs may logically form only one logical cell, and the Pico RRUs in the same logical cell transmit and receive data with the same frequency, resulting in failure of the positioning of terminal devices through the base station.

Some embodiments of the present disclosure provide a method for positioning a terminal device, a server and a non-transitory computer-readable storage medium, so as to realize the positioning of a terminal device in an indoor active distribution system, even when a plurality of Pico RRUs are within one logical cell.

Figure 1:
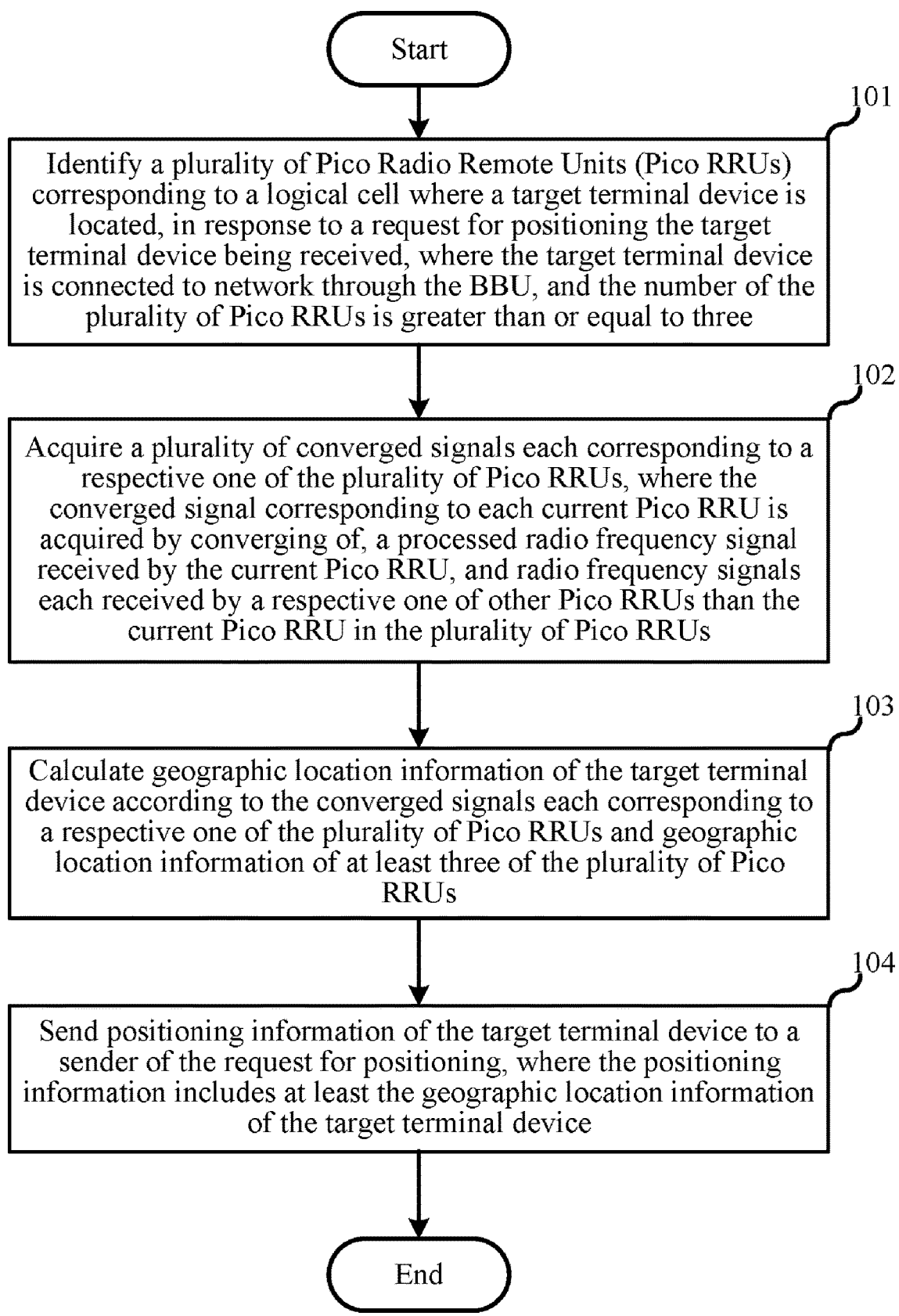
FIG. 1 depicts a flowchart showing a method for positioning a terminal device according to the first embodiment of the present disclosure.

The first embodiment of present disclosure is directed to a method for positioning a terminal device, which is performed by a Building Base band Unit, BBU. The procedure is specifically shown in FIG. 1, and includes the following operations.

At S101, a plurality of Pico Radio Remote Units (Pico RRUs) corresponding to a logical cell where a target terminal device is located are identified, in response to a request for positioning the target terminal device being received, in which the target terminal device is connected to the network through a BBU, and the number of the plurality of Pico RRUs is greater than or equal to three.

In particular, the BBU is a Building Base band Unit in a communication center room of an indoor active distribution system, and the Pico RRUs are Pico Radio Remote Units deployed at various positions indoor. The number of the Pico RRUs is preset according to practical situations, and is greater than or equal to three. In this embodiment, the BBU is connected with each Pico RRU through a Remote Radio Unit-Hub (RHUB), each Pico RRU is electrically communicated with the RHUB via Ethernet, and the RHUB is connected with the BBU through an optical fiber link.

In a case where a target terminal device B is to be positioned by a terminal device A pre-installed with an application (APP) for positioning a terminal device, the terminal device A sends a request for positioning the target terminal device B to a server of the APP through the APP. The request for positioning contains the identity information of the target terminal device B, such as the ID number, the international mobile subscriber identity (IMSI), or the like of the target terminal device B. The server of the APP then sends the request for positioning to the BBU in the base station through the core network. And the core network, once receives the request for positioning containing the identity information of the target terminal device B from the server of the APP, can look for the corresponding relationship between the identity information of the terminal device connected to the network, the base station identifier and the logical cell identifier due to the fact that, the terminal device, when connects to the network through the BBU, will transmit the identity information of the terminal device, the BBU identification and logical cell identification to the core network through the BBU, and the core network locally stores the corresponding relationship between the identity information of the terminal device, the base station identification and the logical cell identification. The core network can find the base station identifier and the logical cell identifier corresponding to the target terminal device B through the corresponding relationship (if any), such that the core network may send the request for positioning with or without the logical cell identifier to the BBU corresponding to the base station identifier.

Figure 2:
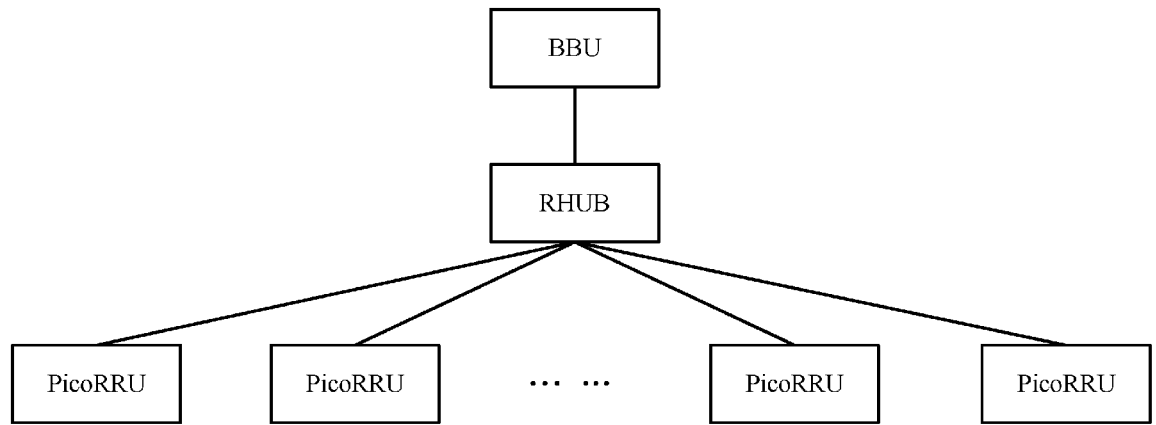
FIG. 2 depicts a schematic diagram showing a non-cascaded networking according to the first embodiment of the present disclosure.
Figure 3:
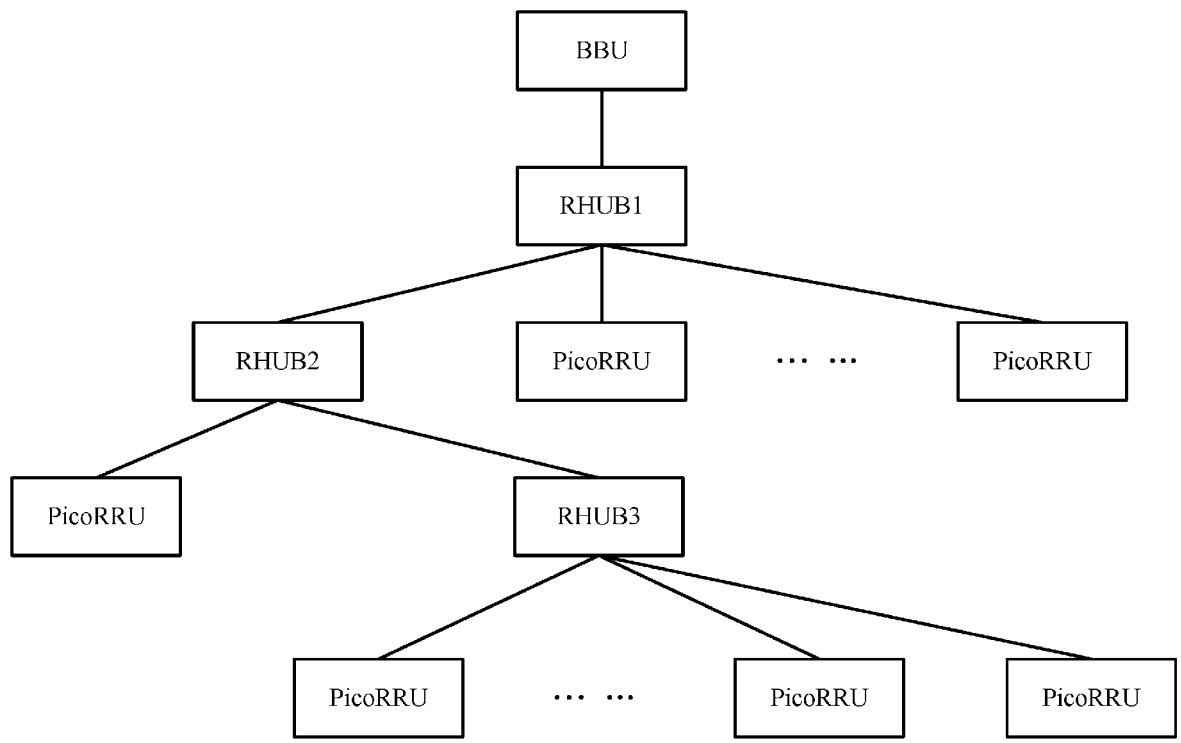
FIG. 3 depicts a schematic diagram showing a cascade networking according to the first embodiment of the present disclosure.

In an example, the request for positioning carries the logical cell identifier of the target terminal device. The BBU determines the logical cell where the target terminal is located according to the logical cell identifier, and acquires a plurality of Pico RRUs corresponding to the logical cell where the target terminal is located. In particular, the core network, once receives the request for positioning containing the identity information of the target terminal device B, from the server of the APP, can look up in the corresponding relationship between the identity information of the terminal devices connected to the network, the base station identifier and the logical cell identifier. And if the identity information corresponding to the target terminal device B is presented, the core network can find the base station identifier and the logical cell identifier corresponding to the target terminal device B through the corresponding relationship, and carries the logical cell identifier in the request for positioning, and send the positioning request containing the logical cell identifier to the BBU corresponding to the base station identifier. The BBU can identify the logical cell where the target terminal device B is located according to the received logical cell identifier in the request for positioning the target terminal device B, and then acquire a plurality of Pico RRUs corresponding to the logical cell where the target terminal device B is located according to the pre-stored correspondence between the logical cell and Pico RRUs during networking. FIG. 2 depicts a schematic diagram showing a non-cascaded networking in which all Pico RRUs corresponding to a logical cell can be found by a direct query to RHUB for the Pico RRUs connected thereto. FIG. 3 depicts a schematic diagram showing a cascaded networking in which all Pico RRUs corresponding to a logical cell can be found by a first query to RHUB1 that is the root node in the logical cell, followed by another query to the sub node RHUB2 that is connected to RHUB1 for Pico RRUs connected thereto, followed by another query to the sub node RHUB3 that is connected to RHUB2 for Pico RRUs connected thereto, and the above procedure repeats until a sub-RHUB no longer has any sub-RHUB. This embodiment and the following embodiments are illustrated based on the non-cascaded networking, but it is not intended to limit to this.

In one example, the request for positioning does not carry the logical cell identifier. The core network, once receives the request for positioning containing the identity information of the target terminal device B from the server of the APP, can query the corresponding relationship between the identity information of the terminal devices connected to the network and the base station identifier. In case that the identity information corresponding to the target terminal device B is found, the core network may find out the base station identifier corresponding to the target terminal device B through the corresponding relationship, and send the request for positioning the BBU corresponding to the base station identifier. The BBU, once receives the request for positioning the target terminal device B, may find out the physical cell identifier corresponding to the target terminal device B, then find out the logical cell where the target terminal device B is located according to the corresponding relationship between the physical cell identifier and the logical cell identifier stored locally in the BBU, and then acquire a plurality of Pico RRUs corresponding to the logical cell which the target terminal device B accesses according to the corresponding relationship between the logical cell and Pico RRUs that was stored during networking.

At S102, a plurality of converged signals each corresponding to a respective one of a plurality of Pico RRUs are acquired, in which the converged signal corresponding to each current Pico RRU is acquired by converging of the following signals, the processed radio frequency signal received by the current Pico RRU and the radio frequency signals each received by a respective one of the other Pico RRUs than the current Pico RRU in the plurality of Pico RRUs.

In an implementation, the radio frequency signal received by the current Pico RRU is processed according to a preset weight value to generate the processed radio frequency signal received by the current Pico RRU. The preset weight value may be greater than 1 (e.g., 2, 3) or less than 1 (e.g., 0.5), and may be set as needed, and it is not intended to limit this in this embodiment. In case that the preset weight value is 2, the radio frequency signal received by a current Pico RRU is duplicated, and in such a case, two identical radio frequency signals are generated. These two identical radio frequency signals are the processed radio frequency signals received by the current Pico RRU, and then they are converged with the radio frequency signals received by the other Pico RRUs in the Pico RRUs than the current Pico RRU to generate the converged signal corresponding to the current Pico RRU. In an example, the processed radio frequency signal received by the current Pico RRU may be generated by an amplifier for processing the radio frequency signal received by the current Pico RRU, that is, to forward or backward amplify the radio frequency signal received by the current Pico RRU to generate the processed radio frequency signal received by the current Pico RRU.

Figure 4:
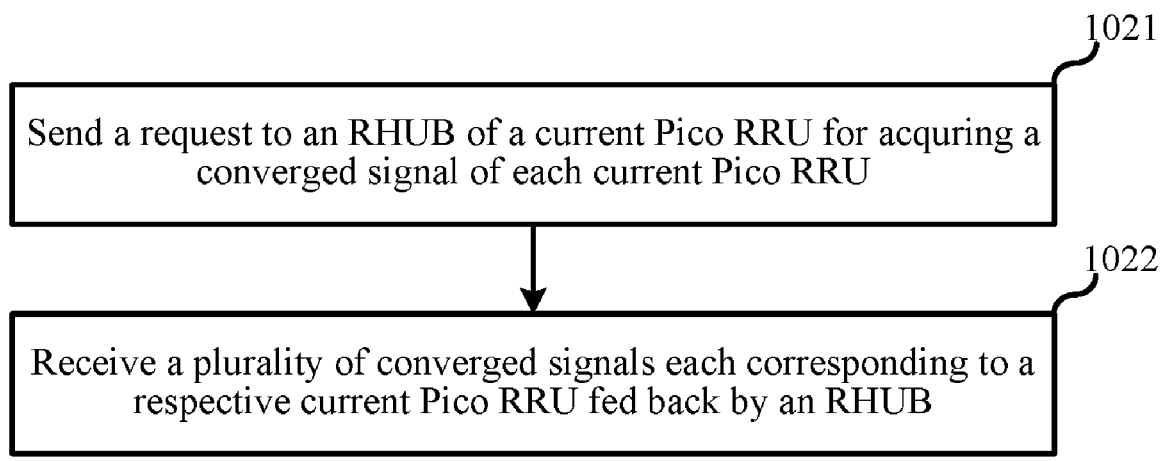
FIG. 4 depicts a flowchart showing an implementation of S102 according to the first embodiment of the present disclosure.

FIG. 4 depicts a flow chart showing the process for acquiring of the converged signals each corresponding to a respective one of a plurality of Pico RRUs according to one implementation, which includes the following operations.

At S1021, a request is sent to an RHUB of a current Pico RRU for acquiring a converged signal of each current Pico RRU.

At S1022, a plurality of converged signals each corresponding to a respective current Pico RRU fed back by an RHUB is received.

In particular, for the non-cascading networking, BBU sends the request for acquiring the converged signal of each current Pico RRU, to the RHUB of the Pico RRU which RHUB performs signal converging, and the RHUB sends the acquired converged signals each corresponding to a respective current Pico RRU to the BBU. For the cascaded networking, the converged signals acquired by RHUB3 are sent to RHUB2, and the converged signals acquired by RHUB2 are sent to RHUB1, and RHUB1 sends the converged signals as acquired to the BBU. In an example, n Pico RRUs are contained in a logical cell, each current Pico RRU is denoted as Pico RRU1, Pico RRU2, . . . , Pico RRUx, . . . , Pico RRUn, x represents the xth signal converging for the current Pico RRU (i.e., Pico RRUx), and the radio frequency signal received by the current Pico RRUx is denoted as radio frequency signal x. The converged signals each corresponding to a respective current Pico RRU are acquired by traversing all Pico RRUs for signal converging, and all Pico RRUs may be traversed in ascending order of the value of x, or all Pico RRUs may be traversed in descending order of the value of x, and it is not intended to limit this in this embodiment.

When the traversing is proceeded to Pico RRUx, a request for the converged signal of Pico RRUx is sent to the RHUB of Pico RRUx. The RHUB, upon receiving the request for the converged signal, processes the radio frequency signal received by the Pico RRUx to generate the processed signal received by the Pico RRUx, and then converges the processed signal with the radio frequency signals received by other (n−1) Pico RRUs to generate the converged signal corresponding to the Pico RRUx.

In this way, the BBU can directly receive the converged signals corresponding to the plurality of Pico RRUs from the RHUB, thereby providing such a manner to acquire the converged signals corresponding to the plurality of Pico RRUs that the processing duty of the BBU is reduced to some extent, thus speeding up the calculation of the position of the target terminal device.

In an implementation, the request for converged signals includes a preset weight value, which is utilized by the RHUB to process the radio frequency signal received by the current Pico RRU to generate the processed radio frequency signal received by the current Pico RRU. It should be noted that the preset weight value is pre-stored in the BBU, and the BBU may only send the preset weight value along with the initial request for converged signal of Pico RRUx sent to the RHUB of Pico RRUx. The RHUB stores the preset weight value locally, and then the BBU does not need to send the preset weight value again. Alternatively, the same preset weight value may be sent along with each request for converged signal of Pico RRUx sent to the RHUB of Pico RRUx. The preset weight value may be a weight value less than 1 (such as 0.5) or greater than 1 (such as 2 or 3) to process the radio frequency signal received by the Pico RRU, and may be set as needed, and which is not specifically limited in this embodiment. In an implementation, the RHUB once receives the radio frequency signal from a Pico RRU, may generate the converged signal corresponding to a current Pico RRU according to the preset weight value for each current Pico RRU, and then send the converged signals corresponding to the Pico RRUs to the BBU, that is, the BBU can directly receive the converged signals corresponding to the RRUs without sending the request for converged signals first.

In an example, the BBU may also generate the converged signal corresponding to each current Pico RRU according to the preset weight value. That is, each current Pico RRU sends the received radio frequency signal to the RHUB, and then the RHUB sends the radio frequency signal from each current Pico RRU to the BBU, and the BBU generates the converged signals corresponding to Pico RRUs according to the preset weight values.

In this way, the BBU can set the preset weight value as needed.

It shall be noted that BBU may fail to receive the aggregated signal corresponding to a current Pico RRU, failing to receive all the converged signals corresponding to the Pico RRUs. The failure in calculation of the geographical location information for the target terminal device would happen when the number of the acquired converged signals corresponding to the Pico RRUs is less than three.

At S103, geographic location information of the target terminal device is calculated according to the converged signals corresponding to Pico RRUs and the geographic location information of at least three of the Pico RRUs.

Specifically, the geographic location information of Pico RRUs is pre-stored in the database of BBU, and the geographic location information of the at least three Pico RRUs can be acquired from the database, so as to calculate the geographic location information of the target terminal device. The geographic location information may be coordinate information, latitude and longitude information, etc., and may be set as needed, which is not specifically limited in this embodiment.

At S104, positioning information of the target terminal device is sent to the sender of the request for positioning, in which the positioning information includes at least the geographic location information.

Specifically, the BBU will send the positioning information of the target terminal device to the server of APP, and the server of APP will send the positioning information of the target terminal device B to the terminal device A. In practical application, the positioning information of the target terminal device is presented in the location APP of the terminal device A, and the location APP may present the positioning information in the corresponding map or navigation path.

In an implementation, after the plurality of Pico RRUs are identified, the method further includes, querying the floor information corresponding to the logical cell and/or querying the region information corresponding to the logical cell. And sending the positioning information of the target terminal device to the sender of the request for positioning includes, sending the positioning information of the target terminal device to the sender of the request for positioning where the positioning information further includes the floor information and/or region information.

Specifically, for multi-floor buildings, logical cells may be deployed according to the floors. In such a case, the corresponding relationship between logical cells and floor information will be pre-stored in BBU's database, and the corresponding floor information of a logical cell can be found in the database. For a large building with one floor, logical cells may be deployed according to regions. In such a case, the corresponding relationship between logical cells and region information is pre-stored in BBU's database, and the region information corresponding to a logical cell can be found in the database. For large multi-floor buildings, logical cells may be deployed according to floors, and logical cells may be deployed in different regions of the same floor. In such a case, the corresponding relationship between logical cells and floor information and region information will be pre-stored in BBU's database, and the corresponding floor information and region information of logical cells can be found in the database. Therefore, the floor information corresponding to the logical cell and/or the region information corresponding to the logical cell, if acquired, would be sent to the terminal device A along with the geographical location information. In practical application, the floor information and/or region information of the target terminal device will be presented in the positioning APP of the terminal device A, along with the geographical location information with the corresponding map or navigation path, so that the user can quickly find the target terminal device B.

In this way, the sender can know not only the positioning information, but also the floor information and/or area information of the target terminal device.

In this embodiment, the BBU includes a control module, a database module, and a coordinate calculation module. The database module is configured to identify a plurality of Pico Radio Remote Units (Pico RRUs) corresponding to a logical cell where a target terminal device is located, in response to a request for positioning the target terminal device being received, in which the target terminal device is connected to network through the BBU, and the number of the plurality of Pico RRUs is greater than or equal to three. The control module is configured to acquire a plurality of converged signals each corresponding to a respective one of the plurality of Pico RRUs, in which the converged signal corresponding to each current Pico RRU is acquired by converging of, a processed radio frequency signal received by the current Pico RRU, and radio frequency signals each received by a respective one of other Pico RRUs than the current Pico RRU in the plurality of Pico RRUs. The coordinate calculation module is configured to calculate geographic location information of the target terminal device according to the converged signals corresponding to Pico RRUs and the geographic location information of at least three of the Pico RRUs. The control module is further configured to send positioning information of the target terminal device to the sender of the request for positioning, in which the positioning information includes at least the geographic location information.

In this embodiment, the Pico RRUs corresponding to the logical cell where the target terminal device is located are identified first, and then the converged signals corresponding to Pico RRUs are acquired, so that the position information of the target terminal device can be calculated according to the acquired converged signals corresponding to Pico RRUs and the positioning information of at least three Pico RRUs of the Pico RRUs, and then the positioning information of the target terminal device is sent to the sender of the request for positioning, in which the positioning information includes at least geographical location information. Therefore, it is possible to position a terminal device in the active indoor distributed system, even if a plurality of Pico RRUs are in the same logical cell.

Figure 5:
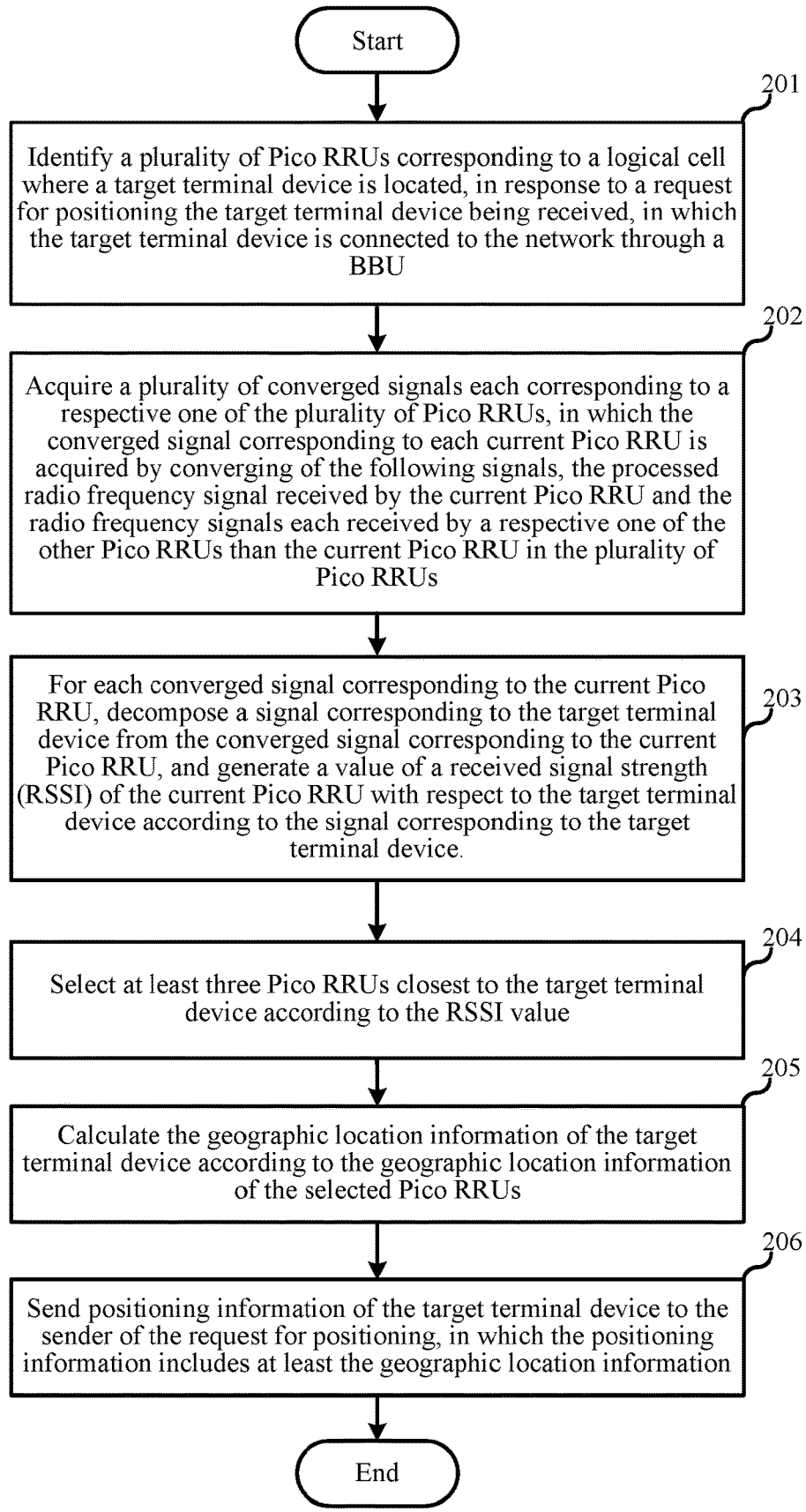
FIG. 5 depicts a flowchart showing a method for positioning a terminal device according to the second embodiment of the present disclosure.

The second embodiment of present disclosure is directed to a method for positioning a terminal device. The second embodiment is generally the same as the first embodiment, and the difference lies in that the geographic location information of at least three Pico RRUs closest to the target terminal device is selected according to the RSSI value, and on this basis, the geographic location information of the target terminal device is calculated. The procedure is specifically shown in FIG. 5.

At S201, a plurality of Pico RRUs corresponding to a logical cell where a target terminal device is located are identified, in response to a request for positioning the target terminal device being received, in which the target terminal device is connected to the network through a BBU.

At S202, a plurality of converged signals each corresponding to a respective one of the plurality of Pico RRUs are acquired, in which the converged signal corresponding to each current Pico RRU is acquired by converging of the following signals, the processed radio frequency signal received by the current Pico RRU and the radio frequency signals each received by a respective one of the other Pico RRUs than the current Pico RRU in the plurality of Pico RRUs.

S201-202 are similar to S101-102, and which will not be repeatedly illustrated here.

At S203, for each converged signal corresponding to the current Pico RRU, the following processing is performed, a signal corresponding to the target terminal device is decomposed from the converged signal corresponding to the current Pico RRU, and a value of a received signal strength (RSSI) of the current Pico RRU with respect to the target terminal device is generated according to the signal corresponding to the target terminal device.

Specifically, the radio frequency signal of each Pico RRU in the logical cell where the target terminal device B is located will be received by the target terminal device B, and the radio frequency signal received by the target terminal device B is called the downlink signal. The target terminal device B, once receives the radio frequency signal from each Pico RRU, will send the radio frequency signal to each Pico RRU, which is called the uplink signal. It shall be noted that other terminals device, if present at this time, will also send radio frequency signals to each Pico RRU, that is, the converged signal corresponding to a Pico RRU contains several signals sent by various terminal devices in the coverage area of the Pico RRU. And the converged signal received by the BBU contains several signals sent by various terminal devices in the coverage area of the Pico RRU. When the terminal devices are connected to the network through a BBU, the BBU will allocate corresponding time-frequency resources for each terminal device, so the BBU can find the time-frequency resources allocated to the target terminal device B, and decompose a signal corresponding to the target terminal device B according to the found time-frequency resources, and then carry out power integration on this signal to generate the RSSI value of each Pico RRU with respect to the target terminal device B.

In an example, generating of the RSSI value of the current Pico RRU with respect to the target terminal device according to a signal corresponding to the target terminal device, includes, sampling a signal corresponding to the target terminal device to generate a plurality of sampled RSSI values of the current Pico RRU with respect to the target terminal device, and calculating an average value of the plurality of sampled RSSI values as the RSSI value of the current Pico RRU with respect to the target terminal device. Specifically, the BBU may preset the sampling duration, for example, by means of a timer, the BBU may acquire a converged signal 1 corresponding to Pico RRU1 within a preset duration T1. Then the BBU may decompose a signal corresponding to target terminal device B according to the time-frequency resources corresponding to target terminal device B, and sample the signal corresponding to target terminal device B to generate several sampled RSSI values. Alternatively, the BBU may also acquire several sampled RSSI values during any sampling time, then calculate the average value of the several sampled RSSI values as the RSSI value of the current Pico RRU with respect to the target terminal device.

In this way, the average value of several sampled RSSI values is taken as the RSSI value of Pico RRU with respect to the target terminal device, such that, the accuracy of the acquired RSSI value of Pico RRU with respect to the target terminal device is improved, thus improving the accuracy of the calculated geographic location information of the target terminal device.

At S204, at least three Pico RRUs closest to the target terminal device are selected according to the RSSI value.

Specifically, the RSSI value, once generated, may be sorted, and at least three Pico RRUs closest to the target terminal device can be selected according to the RSSI value. If the radio frequency signal received by a Pico RRU is processed with a weight value less than 1, the larger the RSSI value is, the closer the Pico RRU is to the target terminal device, such that at least three Pico RRUs corresponding to the top RSSI values are selected (the RSSI values are sorted in descending order by the value), and the geographic location information of the target terminal device is calculated according to the geographic location information of the selected Pico RRUs. For example, if the converged signal corresponding to Pico RRU1 is converged signal 1, and the maximum RSSI value is generated from converged signal 1, then the maximum RSSI value corresponds to Pico RRU1. If the radio frequency signal received by a Pico RRU is processed with a weight value greater than 1, the smaller the RSSI value is, the closer the Pico RRU is to the target terminal device, then at least three Pico RRUs corresponding to the last RSSI values are selected (the RSSI values are sorted in descending order by the value), and the geographic location information of the target terminal device is calculated according to the geographic location information of the selected Pico RRUs. Since the RSSI value is generated from the decomposition of the converged signal, and each converged signal corresponds to a respective one Pico RRU, the Pico RRU corresponding to the RSSI value can be determined. For example, if the converged signal corresponding to Pico RRU2 is converged signal 2, and the minimum RSSI value is generated from converged signal 2, then the minimum RSSI value corresponds to Pico RRU2. It should be noted that it is possible to select Pico RRUs corresponding to at least three of any RSSI values. And the number of the selected Pico RRUs may be preset as needed. In this embodiment and the following embodiments, the radio frequency signal received by a Pico RRU is processed with a weight value of 2 and three Pico RRUs closest to the target terminal device are selected for illustration, but not for limitation.

At S205, the geographic location information of the target terminal device is calculated according to the geographic location information of the selected Pico RRUs.

Figure 6:
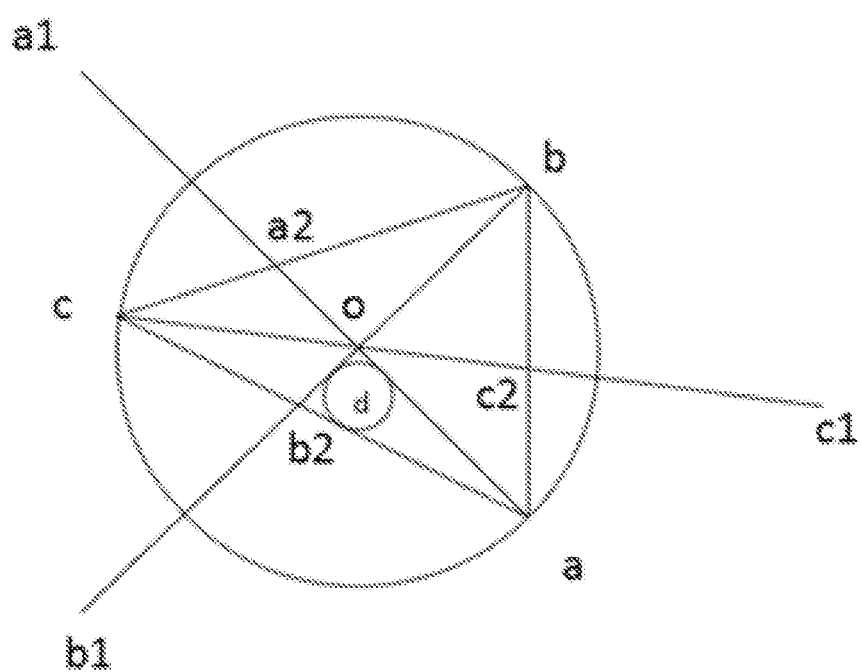
FIG. 6 depicts a schematic diagram showing geographic location information of a target terminal device according to the second embodiment of the present disclosure.

Specifically, the BBU pre-stores the corresponding relationship between Pico RRU and geographic location information, and the geographic location information of the Pico RRU can be determined according to the corresponding relationship, and then the geographic location information of the target terminal device can be calculated. For example, FIG. 6 depicts a schematic diagram showing the geographical location information of the target terminal device. If the selected Pico RRUs are Pico RRU1, Pico RRU2 and Pico RRU3, and the corresponding RSSI values are RSSI1, RSSI2, and RSSI3, and the corresponding positions are located at points A, B, and C, then, in any case, a circumscribed circle through the three points A, B, and C exists. a1, b1, and c1 are points on the extension line from the three points A, B, and C to the center of the circle O, respectively. The circle is divided into three parts by three line segments starting from a1, b1, and c1 respectively. Assuming RSSI1>RSSI2>RSSI3, then the target terminal device shall be positioned in the area enclosed by b1, O, c1, and the circumference. Because RSSI1 has the largest value, the target terminal device B is closest to Pico RRU1. The area is divided into two parts by the line segment oa. The terminal device is positioned in the area enclosed by b1, O and a or in the area surrounded by a, O and c1, depending on the relationship between RSSI2 and RSSI3. If RSSI2>RSSI3, the terminal device shall be positioned in the area enclosed by a, O and c1. If RSSI3>RSSI2, the terminal device shall be positioned in the area enclosed by b1, O and a, while the area enclosed by a, O and c1 or the area enclosed by b1, O and a is a triangular area, the inscribed circle of the triangle can be determined. The position information of a, b and c can be determined according to the pre-stored relationship between Pico RRU and position information, then the positioning information of the center d of the inscribed circle, which is geographical location information of the target terminal device B, can be calculated. It shall be noted that if the number of the selected Pico RRUs is more than three, the geographic location information of the target terminal device B can also be calculated based on the geometric relationship.

At S206, positioning information of the target terminal device is sent to the sender of the request for positioning, in which the positioning information includes at least the geographic location information.

S206 is similar to S104, and which will not be repeatedly illustrated here.

In this way, the geographic location information of the target terminal device is calculated by the geographic location information of at least three selected Pico RRUs closest to the target terminal device according to the RSSI values, which can improve the accuracy of the calculated geographic location information of the target terminal device, as compared with the geographic location information of the target terminal device calculated according to the geographic location information of at least three Pico RRUs that are randomly selected.

In this embodiment, the BBU includes a control module, a database module, and a coordinate calculation module. The database module is configured to identify a plurality of Pico Radio Remote Units (Pico RRUs) corresponding to a logical cell where a target terminal device is located, in response to a request for positioning the target terminal device being received, in which the target terminal device is connected to network through the BBU, and the number of the plurality of Pico RRUs is greater than or equal to three. The control module is configured to acquire a plurality of converged signals each corresponding to a respective one of the plurality of Pico RRUs, in which the converged signal corresponding to each current Pico RRU is acquired by converging of, a processed radio frequency signal received by the current Pico RRU, and radio frequency signals each received by a respective one of other Pico RRUs than the current Pico RRU in the plurality of Pico RRUs. The sampling module is configured to perform the following processing, for each converged signal corresponding to the current Pico RRU, decomposing a signal corresponding to the target terminal device from the converged signal corresponding to the current Pico RRU, and generating a value of a received signal strength (RSSI) of the current Pico RRU with respect to the target terminal device according to the signal corresponding to the target terminal device. The region determining module is configured to select at least three Pico RRUs closest to the target terminal device according to the RSSI value. The coordinate calculation module is configured to, calculate the geographic location information of the target terminal device according to the geographic location information of the selected Pico RRUs. The control module is further configured to send positioning information of the target terminal device to the sender of the request for positioning, in which the positioning information includes at least the geographic location information.

In this embodiment, the accuracy of the calculated geographic location information of the target terminal device is improved by means of the RSSI value.

Figure 7:
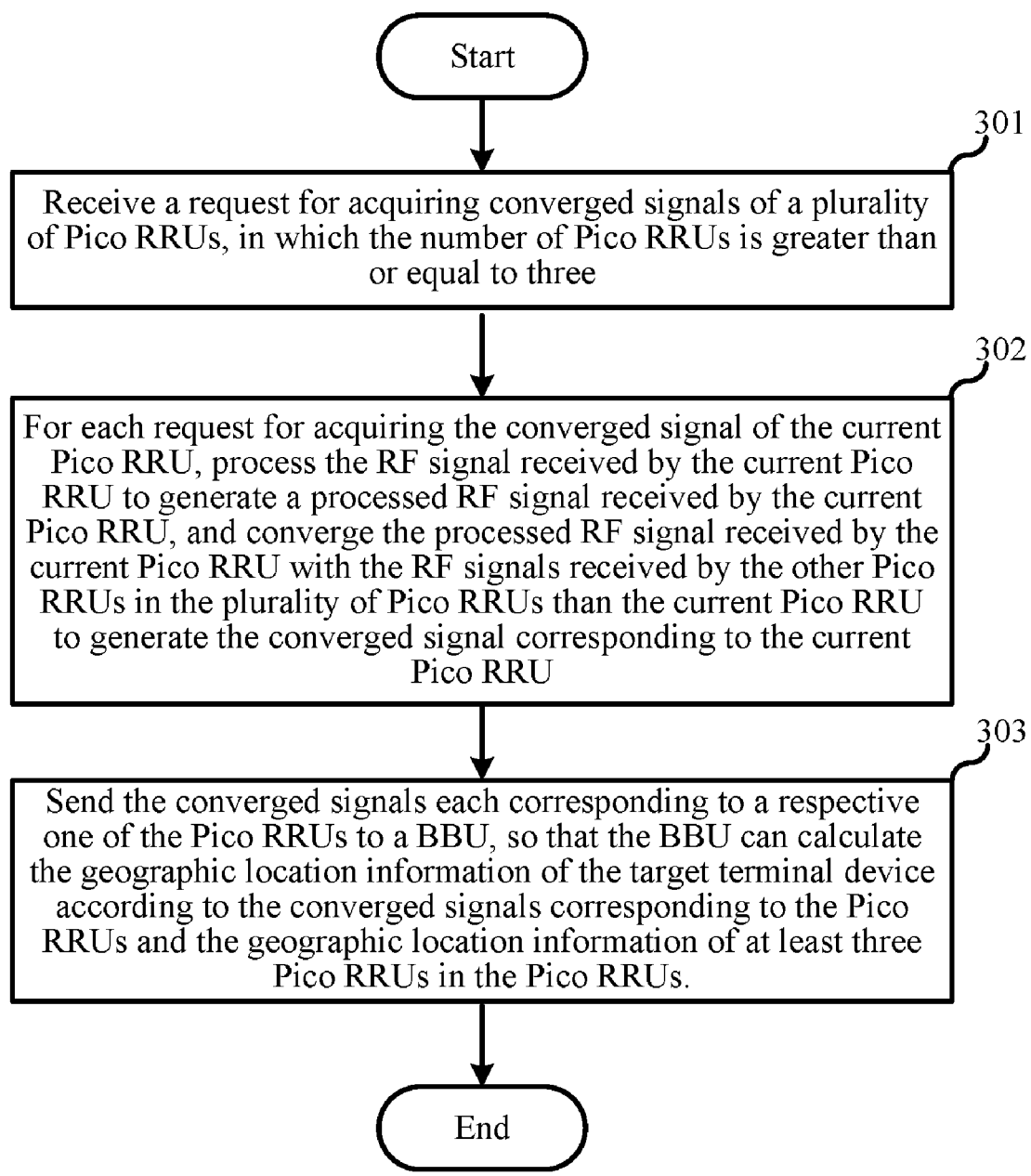
FIG. 7 depicts a flowchart showing a method for positioning a terminal device according to the third embodiment of the present disclosure.

The third embodiment of present disclosure is directed to a method for positioning a terminal device, which is performed by an RHUB. The procedure is specifically shown in FIG. 7, and includes the following operations.

At S301, a request for acquiring converged signals of a plurality of Pico RRUs is received, in which the number of Pico RRUs is greater than or equal to three.

At S302, for each request for acquiring the converged signal of the current Pico RRU, the following processing is performed, processing the radio frequency signal received by the current Pico RRU to generate a processed radio frequency signal received by the current Pico RRU, and the processed radio frequency signal received by the current Pico RRU is converged with the radio frequency signals received by the other Pico RRUs in the plurality of Pico RRUs than the current Pico RRU to generate the converged signal corresponding to the current Pico RRU.

At S303, the converged signals each corresponding to a respective one of the Pico RRUs are sent to a BBU, so that the BBU can calculate the geographic location information of the target terminal device according to the converged signals corresponding to the Pico RRUs and the geographic location information of at least three Pico RRUs in the Pico RRUs.

The processes of the above methods are divided only for clarity of description, and can be combined into one single process or some processes can be divided into several processes, any process in which identical logical relationship to the present disclosure is included shall be within the scope of the present disclosure. The algorithm or process with any minor modifications or insignificant designs which do not change the core design of the algorithm and process, shall be within the scope of the present disclosure.

Figure 8:
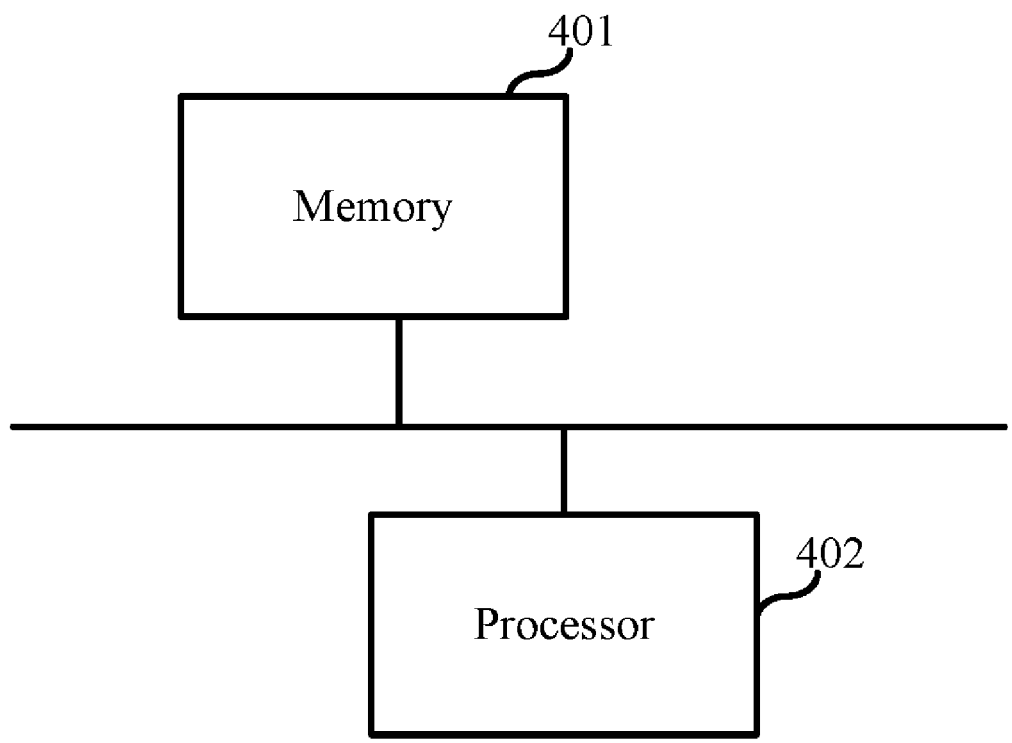
FIG. 8 depicts a schematic diagram showing a server according to the fourth embodiment of the present disclosure.

The fourth embodiment of present disclosure is directed to a server, as shown in FIG. 8, the server includes at least one processor 402, and a memory 401 in communication with the at least one processor, in which the memory 401 stores an instruction executable by the at least one processor 402, which when executed by the at least one processor 402, cause the processor to carry out the method for positioning a terminal device as described in any one of the embodiments above.

The memory 401 and the processor 402 are connected by a bus. The bus can include any number of interconnected buses and bridges, and the bus connects various circuits of one or more processors 402 and the memory 401 together. The bus can also connect various other circuits, such as peripheral devices, voltage regulators, power management circuits, etc., all of which are well known in the art, so they will not be further described here. The bus interface provides an interface between the bus and the transceiver. The transceiver can be one element or a plurality of elements, such as a plurality of receivers and transmitters, providing a unit for communicating with various other devices over a transmission medium. The data processed by the processor 402 is transmitted over the wireless medium through the antenna. Furthermore, the antenna also receives the data and transmits it to the processor 402.

The processor 402 is configured for managing the bus and general processing, and can also provide various functions, including timing, peripheral interface, voltage regulation, power management and other control functions. And the memory 401 can be utilized to store data for the processor 402 during operations.

The fifth embodiment of the present disclosure is directed to a non-transitory computer-readable storage medium storing a computer program, which when executed by a processor, causes the processor to carry out the method as described in any one of the embodiments above.

That is, it shall be appreciated by those having ordinary skill in the art that all or part of the processes for carrying out the above-mentioned method embodiments can be implemented by instructing related hardware through a program, which is stored in a non-transitory computer-readable storage medium and includes several instructions to cause a device (such as a single chip, a chip, etc.) or a processor perform all or part of the processes of the methods in various embodiments of the present disclosure. The aforementioned storage media include: U disk (flash disk), mobile hard disk, Read-Only Memory (ROM), Random Access Memory (RAM), magnetic disk or optical disk and other media that can store program codes.

It shall be understood by those having ordinary skill in the art that the above are some embodiments for implementing the present disclosure, and in practical application, various alternations in form and details can be made without departing from the scope of the present disclosure.

What is claimed is:

1. A method for positioning a terminal device, performed by a baseband processing unit (BBU), the method comprising,
   identifying a plurality of Pico Radio Remote Units (Pico RRUs) corresponding to a logical cell where a target terminal device is located, in response to a request for positioning the target terminal device being received, wherein the target terminal device is connected to network through the BBU, and the number of the plurality of Pico RRUs is greater than or equal to three;
   acquiring a plurality of converged signals each corresponding to a respective one of the plurality of Pico RRUs, wherein the converged signal corresponding to each current Pico RRU is acquired by converging of, a processed radio frequency signal received by the current Pico RRU, and radio frequency signals each received by a respective one of other Pico RRUs than the current Pico RRU in the plurality of Pico RRUs;
   calculating geographic location information of the target terminal device according to the converged signals each corresponding to a respective one of the plurality of Pico RRUs and geographic location information of at least three of the plurality of Pico RRUs; and
   sending positioning information of the target terminal device to a sender of the request for positioning, wherein, the positioning information comprises at least the geographic location information of the target terminal device.

2. The method of claim 1, wherein acquiring a plurality of converged signals each corresponding to a respective one of the plurality of Pico RRUs, comprises,
   sending a request to a Remote Radio Unit-Hub (RHUB) of the current Pico RRU for acquiring a converged signal of each current Pico RRU; and
   receiving a plurality of converged signals each corresponding to a respective current Pico RRU as fed back by the RHUB.

3. The method of claim 2, wherein the request for the converged signal comprises a preset weight value, which is utilized by the RHUB to process the radio frequency signal received by the current Pico RRU to generate the processed radio frequency signal received by the current Pico RRU.

4. The method of claim 1, wherein the processed radio frequency signal received by the current Pico RRU is generated by, processing the radio frequency signal received by the current Pico RRU according to a preset weight value to generate the processed radio frequency signal received by the current Pico RRU.

5. The method of claim 4, wherein the preset weight value is greater than 1.

6. The method of claim 5, wherein the preset weight value is 2.

7. The method of claim 1, wherein calculating of geographic location information of the target terminal device according to the converged signals each corresponding to a respective one of the plurality of Pico RRUs and geographic location information of at least three of the plurality of Pico RRUs, comprises,
   for each converged signal corresponding to the current Pico RRU, decomposing a signal corresponding to the target terminal device from the converged signal corresponding to the current Pico RRU, and generating a value of a received signal strength (RSSI) of the current Pico RRU with respect to the target terminal device according to the signal corresponding to the target terminal device;
   selecting at least three Pico RRUs closest to the target terminal device according to the RSSI value, from the plurality of Pico RRUs; and
   calculating the geographic location information of the target terminal device according to the geographic location information of the selected Pico RRUs.

8. The method of claim 7, wherein generating of a value of a received RSSI of the current Pico RRU with respect to the target terminal device according to the signal corresponding to the target terminal device, comprises,
   sampling the signal corresponding to the target terminal device to generate a plurality of sampled RSSI values of the current Pico RRU with respect to the target terminal device; and
   calculating an average value of the sampled RSSI values as the RSSI value of the current Pico RRU with respect to the target terminal device.

9. The method of claim 1, wherein the request for positioning comprises a logical cell identifier; and
   identifying a plurality of Pico RRUs corresponding to a logical cell where the target terminal device is located comprises,
      determining the logical cell where the target terminal device is located according to the logical cell identifier; and
      identifying a plurality of Pico RRUs corresponding to the logic cell where the target terminal device is located.

10. The method of claim 1, wherein subsequent to identifying of a plurality of Pico RRUs corresponding to the logical cell where the target terminal device is located, the method further comprises, looking up floor information corresponding to the logical cell and/or region information corresponding to the logical cell; and sending positioning information of the target terminal device to a sender of the request for positioning comprises, sending positioning information of the target terminal device to the sender of the request for positioning, wherein the positioning information further comprises the floor information and/or the region information.

11. A method for positioning a terminal device, performed by a Remote Radio Unit-Hub (RHUB), the method comprising, receiving a request for acquiring converged signals of a plurality of Pico Radio Remote Units (Pico RRUs), wherein the number of Pico RRUs is greater than or equal to three;

for each request for acquiring a converged signal of a current Pico RRU, processing a radio frequency signal received by the current Pico RRU to generate a processed radio frequency signal received by the current Pico RRU, and converging the processed radio frequency signal received by the current Pico RRU with the radio frequency signals received by other Pico RRUs in the plurality of Pico RRUs than the current Pico RRU, to generate the converged signal corresponding to the current Pico RRU; and sending a plurality of converged signals each corresponding to a respective one of the Pico RRUs to a baseband processing unit (BBU), such that the BBU can calculate the geographic location information of the target terminal device according to the plurality of converged signals each corresponding to a respective one of the Pico RRUs and the geographic location information of at least three Pico RRUs in the Pico RRUs.

12. A non-transitory computer-readable storage medium storing at least one computer program, which when executed by a processor, causes the processor to carry out a method for positioning a terminal device, performed by a baseband processing unit (BBU), comprising, identifying a plurality of Pico Radio Remote Units (Pico RRUs) corresponding to a logical cell where a target terminal device is located, in response to a request for positioning the target terminal device being received, wherein the target terminal device is connected to network through the BBU, and the number of the plurality of Pico RRUs is greater than or equal to three;

acquiring a plurality of converged signals each corresponding to a respective one of the plurality of Pico RRUs, wherein the converged signal corresponding to each current Pico RRU is acquired by converging of, a processed radio frequency signal received by the current Pico RRU, and radio frequency signals each received by a respective one of other Pico RRUs than the current Pico RRU in the plurality of Pico RRUs;

calculating geographic location information of the target terminal device according to the converged signals each corresponding to a respective one of the plurality of Pico RRUs and geographic location information of at least three of the plurality of Pico RRUs; and sending positioning information of the target terminal device to a sender of the request for positioning, wherein, the positioning information comprises at least the geographic location information of the target terminal device;

or the at least one computer program, when executed by a processor, causes the processor to carry out a method for positioning a terminal device, performed by a Remote Radio Unit-Hub (RHUB), comprising, receiving a request for acquiring converged signals of a plurality of Pico RRUs, wherein the number of Pico RRUs is greater than or equal to three;

for each request for acquiring a converged signal of a current Pico RRU, processing a radio frequency signal received by the current Pico RRU to generate a processed radio frequency signal received by the current Pico RRU, and converging the processed radio frequency signal received by the current Pico RRU with the radio frequency signals received by other Pico RRUs in the plurality of Pico RRUs than the current Pico RRU, to generate the converged signal corresponding to the current Pico RRU; and sending a plurality of converged signals each corresponding to a respective one of the Pico RRUs to a BBU, such that the BBU can calculate the geographic location information of the target terminal device according to the plurality of converged signals each corresponding to a respective one of the Pico RRUs and the geographic location information of at least three Pico RRUs in the Pico RRUs.

13. The non-transitory computer-readable storage medium of claim 12, wherein acquiring of a plurality of converged signals each corresponding to a respective one of the plurality of Pico RRUs, comprises, sending a request to a Remote Radio Unit-Hub (RHUB) of the current Pico RRU for acquiring a converged signal of each current Pico RRU; and receiving a plurality of converged signals each corresponding to a respective current Pico RRU as fed back by the RHUB.

14. The non-transitory computer-readable storage medium of claim 13, wherein the request for the converged signal comprises a preset weight value, which is utilized by the RHUB to process the radio frequency signal received by the current Pico RRU to generate the processed radio frequency signal received by the current Pico RRU.

15. The non-transitory computer-readable storage medium of claim 12, wherein the processed radio frequency signal received by the current Pico RRU is generated by, processing the radio frequency signal received by the current Pico RRU according to a preset weight value to generate the processed radio frequency signal received by the current Pico RRU.

16. The non-transitory computer-readable storage medium of claim 12, wherein calculating of geographic location information of the target terminal device according to the converged signals each corresponding to a respective one of the plurality of Pico RRUs and geographic location information of at least three of the plurality of Pico RRUs, comprises, for each converged signal corresponding to the current Pico RRU, decomposing a signal corresponding to the target terminal device from the converged signal corresponding to the current Pico RRU, and generating a value of a received signal strength (RSSI) of the current Pico RRU with respect to the target terminal device according to the signal corresponding to the target terminal device;

selecting at least three Pico RRUs closest to the target terminal device according to the RSSI value, from the plurality of Pico RRUs; and calculating the geographic location information of the target terminal device according to the geographic location information of the selected Pico RRUs.

17. The non-transitory computer-readable storage medium of claim 16, wherein generating of a value of a received RSSI of the current Pico RRU with respect to the target terminal device according to the signal corresponding to the target terminal device, comprises, sampling the signal corresponding to the target terminal device to generate a plurality of sampled RSSI values of the current Pico RRU with respect to the target terminal device; and calculating an average value of the sampled RSSI values as the RSSI value of the current Pico RRU with respect to the target terminal device.

18. The non-transitory computer-readable storage medium of claim 12, wherein the request for positioning comprises a logical cell identifier; and identifying a plurality of Pico RRUs corresponding to a logical cell where the target terminal device is located comprises, determining the logical cell where the target terminal device is located according to the logical cell identifier; and identifying a plurality of Pico RRUs corresponding to the logic cell where the target terminal device is located.

19. The non-transitory computer-readable storage medium of claim 12, wherein subsequent to identifying of a plurality of Pico RRUs corresponding to the logical cell where the target terminal device is located, the method further comprises, looking up floor information corresponding to the logical cell and/or region information corresponding to the logical cell; and sending positioning information of the target terminal device to a sender of the request for positioning comprises, sending positioning information of the target terminal device to the sender of the request for positioning, wherein the positioning information further comprises the floor information and/or the region information.

\* \* \* \* \*